US006021942A

United States Patent [19]

Monico

[11] Patent Number: 6,021,942

[45] Date of Patent: Feb. 8, 2000

[54] BAR-CODED LABEL FOR "ATTEMPT TO DELIVER" PARCELS

[75] Inventor: Dominic L. Monico, Williamsville, N.Y.

[73] Assignee: Moore U.S.A. Inc., Grand Island, N.Y.

[21] Appl. No.: 08/990,135

[22] Filed: Dec. 12, 1997

[51] Int. Cl.[7] .............................. B42D 15/00; G06K 7/10

[52] U.S. Cl. ............................ 235/375; 235/385; 283/79; 283/101

[58] Field of Search .................................... 235/375, 385, 235/487, 488; 283/81, 79, 80, 101, 105; 428/43

[56] References Cited

U.S. PATENT DOCUMENTS

| | | | |
|---|---|---|---|
| 3,987,960 | 10/1976 | Gardiner | 229/74 |
| 4,526,404 | 7/1985 | Vazquez . | |
| 4,580,815 | 4/1986 | Barber . | |
| 4,682,793 | 7/1987 | Walz | 282/11.5 |
| 4,818,850 | 4/1989 | Gombrich et al. . | |
| 4,928,874 | 5/1990 | Henry et al. | 229/74 |
| 4,995,642 | 2/1991 | Juszak et al. | 283/105 |
| 5,048,870 | 9/1991 | Mangini et al. | 283/81 |
| 5,071,167 | 12/1991 | O'Brien . | |
| 5,240,456 | 8/1993 | Ochiai . | |
| 5,267,898 | 12/1993 | Doll et al. | 462/6 |
| 5,271,642 | 12/1993 | Jahier et al. . | |
| 5,282,649 | 2/1994 | Williams et al. | 283/56 |
| 5,338,068 | 8/1994 | Arbach et al. | 283/116 |
| 5,348,780 | 9/1994 | Boggs et al. | 428/42 |
| 5,413,383 | 5/1995 | Laurash et al. | 283/79 |
| 5,419,591 | 5/1995 | Lambert et al. . | |
| 5,421,778 | 6/1995 | Kouramanis | 462/2 |
| 5,484,168 | 1/1996 | Chigot | 283/67 |
| 5,484,170 | 1/1996 | Hatfield, Jr. | 283/79 |
| 5,493,107 | 2/1996 | Gupta et al. . | |
| 5,509,694 | 4/1996 | Laurash et al. | 283/81 |
| 5,530,517 | 6/1996 | Patton et al. . | |
| 5,536,546 | 7/1996 | Nash | 428/43 |
| 5,547,227 | 8/1996 | Laurash et al. | 283/81 |
| 5,573,277 | 11/1996 | Petkovsek | 283/79 |
| 5,585,156 | 12/1996 | Fontana | 428/43 |
| 5,664,725 | 9/1997 | Walz | 229/92 |
| 5,704,649 | 1/1998 | Small | 283/81 |
| 5,704,650 | 1/1998 | Laurash et al. | 283/81 |
| 5,746,450 | 5/1998 | Petkovsek | 283/61 |
| 5,752,647 | 5/1998 | Schubert et al. | 229/92.1 |
| 5,756,175 | 5/1998 | Washburn | 428/42.3 |
| 5,776,571 | 7/1998 | Michlin et al. | 428/40.1 |
| 5,829,789 | 11/1998 | Treleaven et al. | 283/81 |
| 5,846,624 | 12/1998 | Denklau et al. | 428/42.3 |
| 5,887,904 | 3/1999 | Petkovsek | 283/61 |
| 5,899,504 | 5/1999 | Fabel | 283/109 |

FOREIGN PATENT DOCUMENTS 2 683 069 10/1991 France .

OTHER PUBLICATIONS

DHL label form; admitted prior art.

*Primary Examiner*—Donald Hajec
*Assistant Examiner*—Douglas X. Rodriguez
*Attorney, Agent, or Firm*—Nixon & Vanderhye P.C.

[57] ABSTRACT

A package delivery facilitating business form, and method of facilitating delivery of the package, are easy to use and implement. A business form typically is a sheet with three sections each backed with repositional adhesive and one of the sections having bar coding which indicates a number of different reasons for non-delivery of a package. If a package cannot be successfully delivered on a first attempt the third section of the form is detached and adhesively secured at the attempted delivery location and the identification bar code and reason for non-delivery bar code on the first section are scanned into the computer, and the first section is adhesively secured to the non-deliverable package. If a second attempt is also unsuccessful a release liner is removed from the adhesive on the second section, and a second section is adhesively secured at the attempted-delivery section. Business forms preferably are provided in a pad and include blank spaces to allow handwritten addition to be easily filled in, and include common machine and human-readable addition on all sections.

20 Claims, 3 Drawing Sheets

BAR-CODED LABEL FOR "ATTEMPT TO DELIVER" PARCELS

BACKGROUND AND SUMMARY OF THE INVENTION

All courier and delivery companies experience situations where a package cannot be successfully delivered and it is necessary to notify the addressee that a package delivery was attempted, so that there is a good probability that delivery may ultimately be accomplished. The present methods and forms for facilitating a notification and re-delivery are not as effective as desired, and do not allow for ready automated capture and utilization of non-delivery information. Typically the delivery person needs to hand write on a label/form left with the addressee, make a note on the package, or in a manifest, and attempt delivery at some later date.

According to the present invention a business form and a method of utilization thereof are provided which greatly facilitate accurate delivery of a package when the first delivery attempt is unsuccessful. A business form and method according to the invention are specifically designed to provide for automated capture of information relating to non-delivery, and provide a very simple yet effective and accurate mechanism for notification of the addressee, accurate tracking of the package status, and automated entry of tracking information into a database.

According to one aspect of the present invention a business form is provided comprising the following components: a sheet of imagable material (preferably paper) having top and bottom edges, first and second side edges, a front face, and a rear face. At least two lines of weakness (such as perforation lines, score lines, diecuts, etc.) formed in the sheet extending generally parallel to at least one of the top and bottom edges, and defining the sheet into at least first, second and third sections, the second section between the first and third sections, the first section containing or adjacent the top edge, and the third section containing or adjacent the bottom edge. Repositional pressure sensitive adhesive disposed on the third and second section rear faces, and pressure sensitive adhesive disposed on the first section rear face. Indicia imaged on the first, second, and third section front faces. And, a release liner covering the repositional pressure sensitive adhesive on the second section rear face.

The pressure sensitive adhesive disposed on the first section rear face is also preferably repositional adhesive, and although in some cases a release liner may be used to cover the repositional adhesive on each of the sections. In the preferred embodiment the business forms are provided in a pad and the first and third faces are devoid of a release liner. The indicia imaged on the first, second and third section front faces preferably includes bar code (or other machine-readable) indicia that is in common on each of the section front faces, and indicia imaged on the second and third faces typically includes a toll-free telephone number. When the business form is in a pad with a plurality of other business forms, identical except for some indicia (such as identification, human-readable and machine-readable indicia) thereon, the repositional adhesive on the first and third sections is in contact with the front faces of the first and third sections, respectively of another business form in the pad. The adhesive on the first section rear face is ultimately moved into an engagement with, and is held to, a package. The term "package" as used in the present specification in claims means any material for which attempted delivery by a courier or delivery service is feasible, including envelopes containing only documents, physical merchandise, whether boxed in containers or not, etc.

Typically the business form sheet is quadrate and the top and bottom edges are substantially parallel to each other and substantially perpendicular to the side edges. The form may consist of the first, second and third sections, or other sections can be provided with other attempted delivery information, or for other purposes. The indicia on the third section front face typically includes human-readable indicia indicating the first attempt to deliver a package, and the indicia on the second section front face typically includes human-readable indicia indicating second attempt to deliver a package. Machine-readable indicia corresponding to this human-readable indicia also is preferably provided. The first section also preferably includes non-delivery machine and human-readable indicia imaged on the front face thereof, this indicia comprising at least three different machine-readable indicia elements, and associated human-readable indicia elements, giving potential reasons for non-delivery of the package, such as "wrong address", "consignee not at home", "office closed", "damaged", "refused delivery", "wrong route", "non-deliverable (no time)", etc. Business forms may automatically be applied to all packages to be delivered, and have the same tracking number as those packages, but more desirably the forms are only utilized when non-delivery of a package results.

According to another aspect of the present invention a package delivery facilitating business form is provided comprising (or consisting of) the following components: A sheet of imagable material having top and bottom edges, first and second side edges, a front face, and a rear face. At least one line of weakness formed in the sheet extending generally parallel to at least one of the top and bottom edges, and defining the sheet into at least first and second sections, the first section containing or adjacent the top edge. Repositional pressure sensitive adhesive disposed on the second section rear face, and pressure sensitive adhesive dispossed on the first section rear face. Indicia imaged on the first and second section front faces, including common machine-readable indicia. Reason for non-delivery machine and human-readable indicia imaged on the first section front face, comprising at least three different machine-readable indicia elements, and associated human-readable indicia elements, giving potential reasons for non-delivery of a package.

A release liner may be provided covering the repositional pressure sensitive adhesive in the second section rear face, and the first section adhesive may be an engagement with the package to be delivered. The business form may further comprise a third section separated by a second line of weakness (such as a perforation line) from the second section, and having a rear face with repositional adhesive, and a front face with indicia image thereon. The indicia image on the front face of each of the second and third sections preferably comprises human-readable indicia indicating an attempt to deliver a package, include indicia such as "first attempt", "second attempt", a date or time when redelivery may be attempted again. According to another aspect of the present invention a method of facilitating accurate delivery of a package utilizing a business form having a plurality of adhesive-backed sections including a first section having machine-readable identification indicia. And, reason for non-delivery machine and human-readable indicia, comprising at least three different machine-readable indicia elements, and associated human-readable indicia elements, giving potential reasons for non-delivery of a package, imaged thereon, and also including another section is provided. A method comprises the steps of: unsuccessfully attempting to deliver a package at a first location. Scanning the machine readable identification indicia and the appropriate, selected, reason for non-delivery machine-readable indicia on the business form first section, to read these indicia into a database. Separating another section of the business form from the first section, and using the adhesive backing of another section, securing it to a surface at the first location. Securing the business form first section, using the adhesive backing of the first section, to the package unsuccessfully delivered. Transporting the unsuccessfully delivered package with first section of the business form applied thereto to a second location awaiting attempted re-delivery or return of the package.

The business form typically includes second and third sections, the second and third sections having repositional adhesive and the second section having a release liner covering the repositional adhesive; and step (c) is practiced to separate and secure the third section. The method also typically comprises the further steps of: (f) Unsuccessfully attempting to deliver the package at the first location a second time. (g) Separating the second section of the business form from the first section, removing the release liner from the adhesive backing of the second section, and using the adhesive backing of the second section, securing it to a surface at the first location. And, (h) transporting the unsuccessfully delivered package with the first section of the business form applied thereto to the second or to a third location awaiting attempted re-delivery or return of the package. A business form may be provided in a pad of like business forms, with different identification indicia, and there is the further step of removing the business form from the pad of business forms prior to the practice of step (d).

Another section of the business form typically includes blank areas for potential other delivery dates or times, and there is typically the further step of handwriting a potential other delivery date or time in the blank areas prior to step (a). The form will typically also include a toll-free number requesting the addressee/consignee to call the toll-free number if the potential delivery date or time is not feasible.

It is the primary object of the present invention to facilitate the accurate and effective notification of every delivery of packages if an unsuccessful attempt is made to deliver the package. This and other objects of the invention will become clear from an inspection of the detailed description of the invention and from the appended claims.

DETAILED DESCRIPTION OF THE DRAWINGS

Figure 1:
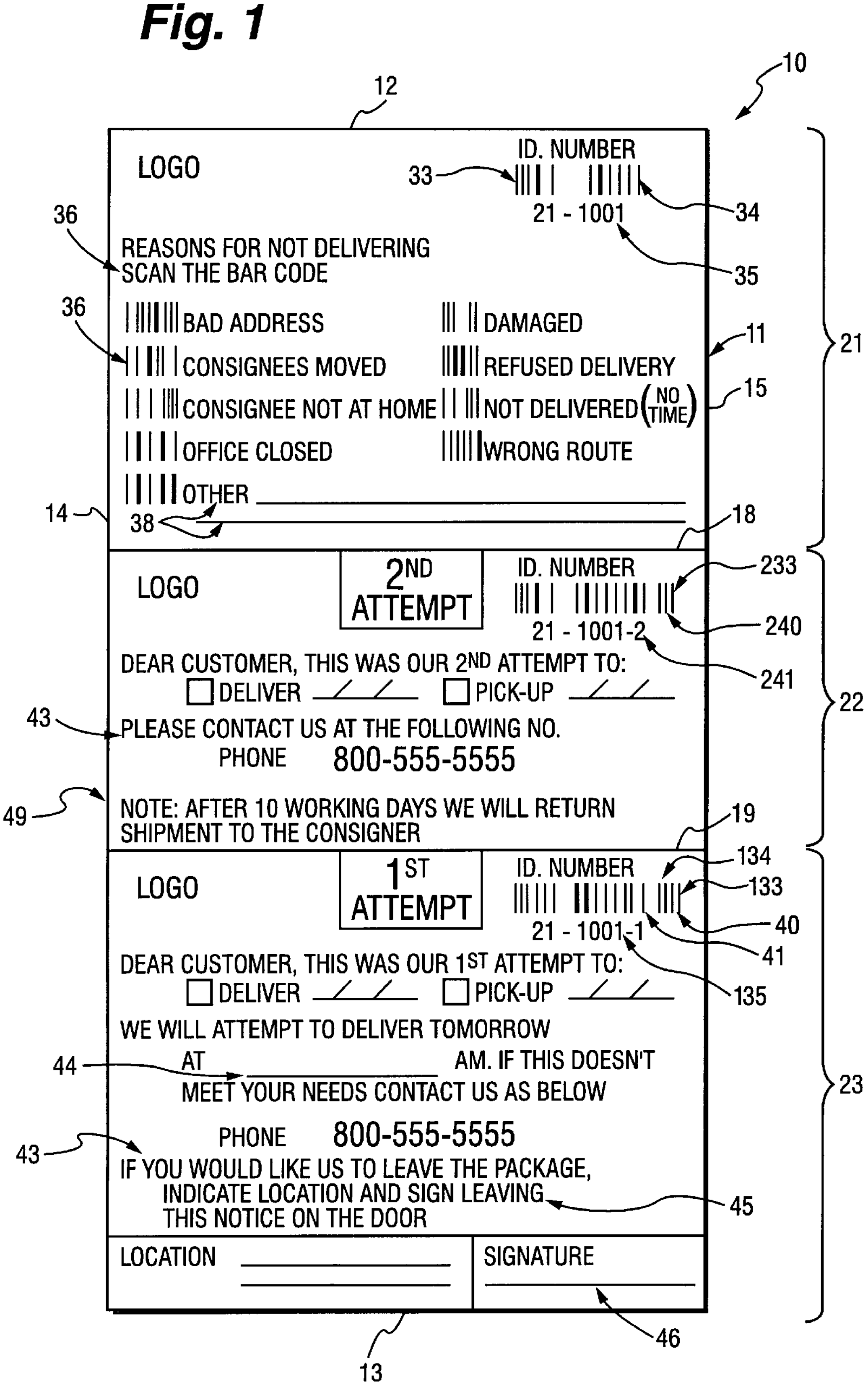
FIG. 1 is a top plan view of an exemplary business form according to the present invention.

An exemplary business form according to the present invention is shown generally by reference numeral 10 in FIGS. 1–4. The form 10 comprises a sheet 11 of imagable material, typically paper, having top and bottom edges 12, 13 and first and second side edges 14, 15, a front face 16 (see FIG. 1), and a rear face 17 (see FIG. 2). Preferably the form is quadrate in configuration as illustrated in the drawings, the edges 12, 13 being substantially parallel to each other and substantially perpendicular to the edges 14, 15 (which edges 14, 15 are substantially parallel to each other).

The form 10 also comprises one or more (e.g. at least two) lines of weakness, such as the two lines of weakness 18, 19 in the drawings. The lines of weakness 18, 19 may be any conventional lines of weakness such as score lines, crease lines, diecuts, or the like, but preferably are perforations as illustrated in the drawings. The lines 18, 19 are preferably substantially parallel to one or both of the edges 12, 13, and define the form 10 into various sections, including at least two sections. In the embodiment illustrated in the drawings the sheet 11 is divided into three sections, a first section 21, a second section 22, and a third section 23, although more than three sections may be provided (and perforations or like lines of weakness parallel to the edges 14, 15 may also or alternatively be utilized), or two sections may be provided in some circumstances.

Figure 2:
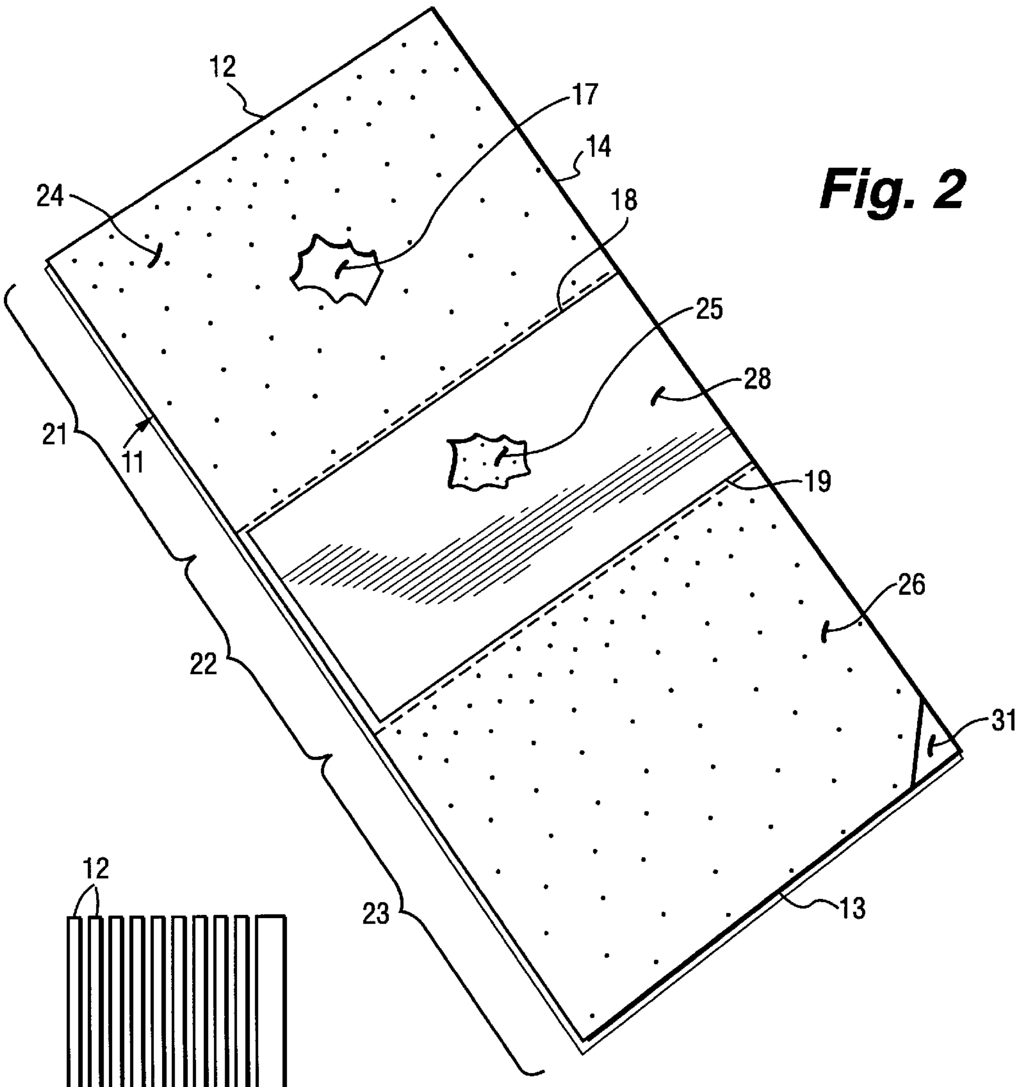
FIG. 2 is a rear prospective view of the form of FIG. 1.

Part or all of the face 17 is covered with pressure sensitive adhesive. FIG. 2 illustrates three different repositional adhesive strips, blocks, or other patterns, 24, 25, and 26 associated with the sections 21–23, respectively. All three blocks or patterns of repositional adhesive 24–26 may be the same adhesive, applied continuously to the entire face 17. Preferably the adhesive blocks or patterns 25, 26 are repositional adhesive (such as "CLEANTAC" adhesive available from Moore U.S.A., Inc. of Lake Forest, Ill.) of any conventional type, and preferably the adhesive 24 is also repositional adhesive, although it may be permanent adhesive or removable adhesive in some circumstances.

A conventional release liner 28 (see FIGS. 2–4) is preferably provided covering the adhesive 25 in the second section 22 of rear face 17. The release liner 28 is of any conventional release liner material, such as silicone coated paper. The purpose of the release liner 28 is to protect the adhesive 25 even when the third section 23 has been removed and the first section 21 is adhered to a package (as will be further described). While in the preferred embodiment—which includes providing the business form 10 in a pad or like form, such as the pad 29 illustrated in FIG. 3—if the forms 10 are provided as individual sheets preferably a release liner is provided to cover up the adhesive 24, 26 in the sections 21, 23 also.

Figure 3:
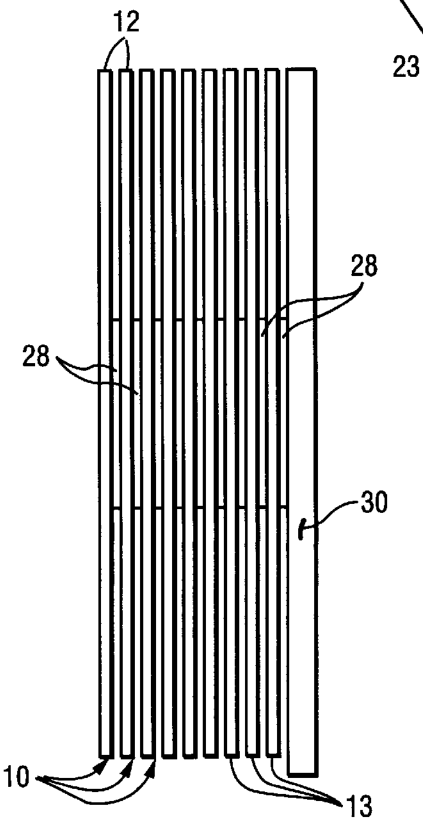
FIG. 3 shows the form of FIGS. 1 and 2 in a pad with other forms.

FIG. 3 illustrates a pad 29 of business forms 10 according to the invention. Typically all of the forms in the pad 10 are identical except for identification indicia thereon. The pad 29 includes a backing, which may be of paper (including paper having a release coating), cardboard, or the like, 30. The repositional adhesive on each of the sections 21, 23 engages the repositional adhesive on the like, underlying form 10, and since the adhesive is repositional each form will readily separate from the others. If desired one or more positions of each of the forms 10—such as the corner portion 31 illustrated in FIG. 2—may be devoid of adhesive so as to facilitate easy removal of the forms 10 from the pad 29.

If the adhesives 24, 26 utilized for the forms 10 in the pad 29 are particularly aggressive, or are not repositional, it may be desirable to coat the front face 16 of each of the forms 10 with a release coating, such as silicone. If the forms 10 include release liners covering all of the sections 21–23, then the forms 10 may either be individual sheets, or if connected in a pad may have conventional binding materials joining all of the forms 10 at the top edges 12 thereof, to each other and to a backing 30.

The forms 10 also have indicia imaged on the front face 16 thereof, and the particular indicia utilized according to the invention greatly facilitates utilization of the forms 10 for package delivery functions. Preferred indicia utilized according to the invention is best seen in FIG. 1.

The first section 21 typically includes identification indicia shown generally by reference 33 in FIG. 1, and including a machine-readable (e.g. bar code) part 34, and a human-readable part 35. The first section 21 also comprises a plurality of (at least two, and preferably at least three) reason for non-delivery indicia. These indicia all include a machine-readable (e.g. bar code) part 36 and a corresponding human-readable part 37. The particular reason for non-delivery indicia illustrated in FIG. 1 include "wrong address", "consignee moved", "consignee not at home", "office closed", "damaged", "refused delivery", "not delivered (no time)", "wrong route", and "other". The "other" indicia is followed by lines 38 facilitating the entry of handwritten information. The above reasons for non-delivery are exemplary only and different or other wording and/or reasons may be provided.

The third section 23, which may be connected directly to the first section 21 if the second section 22 is not provided, preferably includes indicia 133 in common with the indicia 33 (except having an extender indicating the first attempt at delivery). This includes a machine-readable part 134 and a human-readable part 135, with the extenders 40, 41. The indicia imaged on the third section 23 also preferably includes human-readable indicia 42 (e.g. "first attempt") indicating a first attempt to deliver a package, and preferably also includes a toll-free telephone number indicia 43 to call if an indicated redelivery time is inconvenient, to request redelivery, and/or for questions, and one or more blank areas 44 for the entry of handwritten indicia indicating potential other delivery dates or times. Also there may be indicia 45 indicating that if the addressee/consignee would like the package merely left at the door that he or she can sign at the indicia 46 and on the next delivery the package will merely be left at the door. Other suitable indicia also may be provided, as illustrated in the example in FIG. 1.

The second section 22 also includes identification indicia 233, but with a different extender 240, 241, the indicia 233—except for the extender—in common with the indicia 33, 133. Attempted delivery indicia ("second attempt") 48 also is provided, as well as the toll-free telephone number 43, and any other suitable notification indicia, such as the indicia 49 illustrated in FIG. 1. If multiple attempts will be made by the courier delivery service, the second section 22 may be substantially identical to the first section 23 (except for the extenders 240, 241 and the indicia 48) and other sections for third or subsequent attempts may also be provided.

The business forms 10 according to the present invention facilitate the practice of a method of accurately delivering packages, with automated entry into a database of a wide variety of information being provided. An exemplary method according to the present invention will be described most particularly with respect to FIG. 4.

A courier or delivery service driver unsuccessfully attempts to deliver a package 51 to an addressee/consignee, the address 52 (as well as typically return address 53) being provided on the package 51. When the attempt is known to be unsuccessful, the driver scans one of the machine-readable indicia elements 36 (corresponding to the correct human-readable indicia 37) using a conventional scanner 54 of any type. Typically only one indicia element 36 can be scanned for a particular identification indicia 34, but under some circumstances programming may be provided to allow more than one reason for non-delivery to be scanned. The driver also scans in the I.D. number 34 of the form 10, both the I.D. number 34 and the reason for non-delivery 36 being transmitted to a suitable database in a computer 55 which may be in the driver's possession, or electronically connected in some conventional manner to the scanner 54 and at a central location.

The driver typically fills in the blank space 44 on the form section 23, and then separates the form section 23 from the rest of the form 10 by tearing along the perforation line 19. If the form 10 is in a pad 29 prior to, or at the same time as, removal of the section 23 from the rest of the form 10 the form 10 is removed from the pad 29.

Figure 4:
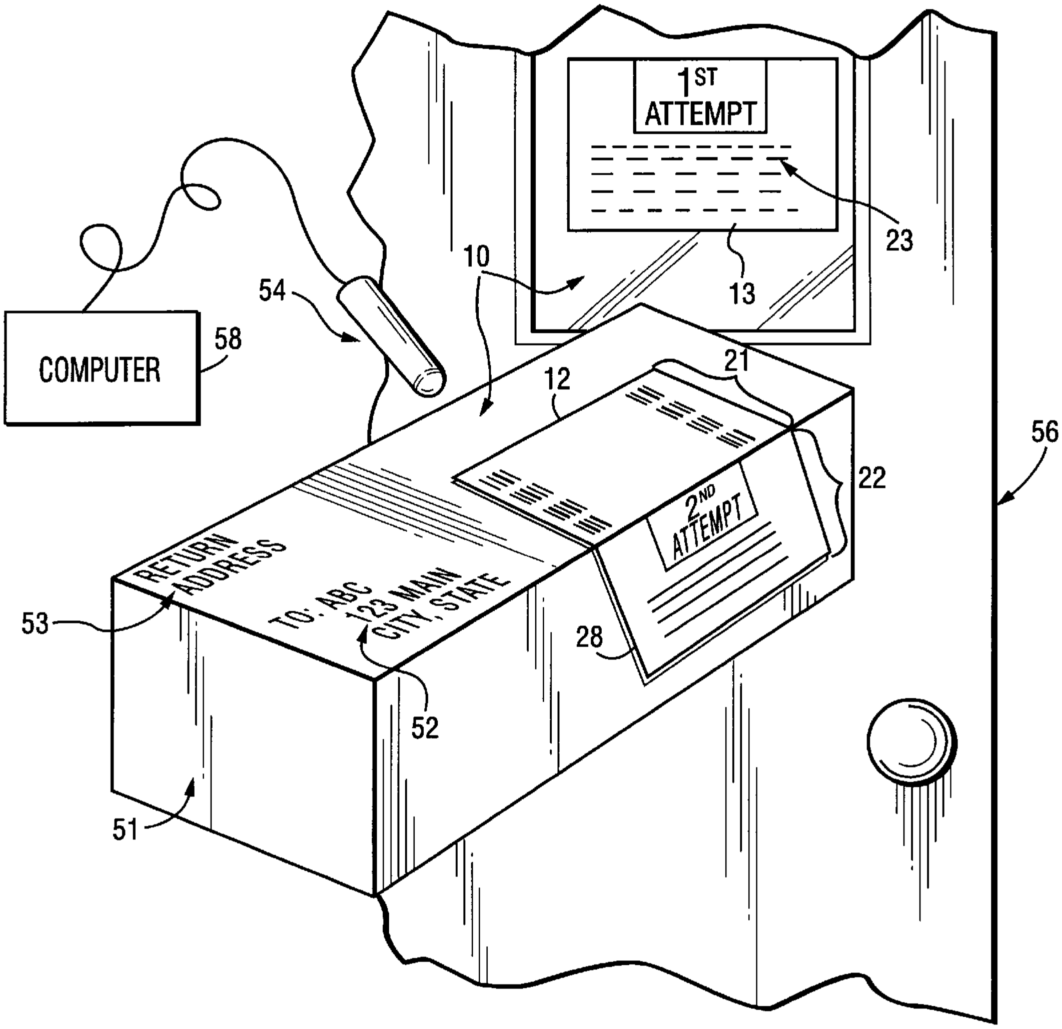
FIG. 4 schematically illustrates utilization of the form of FIGS. 1 and 2 and associated with the attempted delivery, and notification of non-delivery, of a package.

The repositional adhesive 26 on the section 23 is then pressed onto a surface—such as a door 56—at the addressee's location, and the adhesive 24 on the section 21 is pressed into engagement with the package 51, with the section 22 still connected thereto (as seen in FIG. 4). The driver then transports the unsuccessfully delivered package 51 to a second location awaiting attempted redelivery or return (e.g. to the return address 53) of the package 51. The redelivery date or time information may also be entered into the database in the computer 55, or various other machine-readable indicia elements may be provided on the form section 21—or on a separate key sheet—so that the redelivery time or date to be attempted is also scannable into the database using the scanner 54.

At the redelivery date or time indicated in the blank 44, or at such other time as requested by the addressee by calling the toll-free telephone number of the indicia 43, the driver attempts to redeliver the package 51 again. If that attempt is also unsuccessful, that is noted on the second section 22, the second section 22 is separated from the first section 21 by tearing along the perf line 18, the release liner 28 is removed from the adhesive 25, and the adhesive 25 is pressed into contact with a surface at the addressee's location, such as the door 56. The package 51 is then again returned to the second location, or another location, either for attempted redelivery or (as indicated by the indicia 49 on form section 22) returned to the return address 53 after 10 days (or other suitable waiting period).

The I.D. numbers 133, 233, with the extensions 40, 41, 240, 241, also typically are scanned into the database using the scanner 54 at the appropriate unsuccessful delivery attempt times.

It will thus be seen that according to the present invention a simple yet effective business form, which particularly facilitates the accurate delivery of packages when the first attempt is unsuccessful, as well as a simple, automation-friendly, package delivery facilitating method, are provided. While the invention has been herein shown and described as what is presently conceived to be the most practical and preferred embodiment thereof will be apparent to those of ordinary skill in the art that many modifications may be made thereof within the scope of the invention, which scope is to be accorded the broadest interpretation of the appended claims so as to encompass all equivalent structures and methods.

What is claimed is:

1. A business form comprising:

a sheet of imagable material having top and bottom edges, first and second side edges, a front face, and a rear face;

at least two lines of weakness formed in said sheet extending generally parallel to at least one of said top and bottom edges, and defining said sheet into at least first, second and third sections, said second section between said first and third sections, said first section containing or adjacent said top edge, and said third section containing or adjacent said bottom edge;

repositional pressure sensitive adhesive disposed on said third and second section rear faces, and pressure sensitive adhesive disposed on said first section rear face;

indicia imaged on said first, second, and third section front faces; and a release liner covering said repositional pressure sensitive adhesive on said second section rear face; and wherein said pressure sensitive adhesive disposed on said first section rear face is repositional adhesive, and wherein said first and third rear faces are devoid of a release liner; and wherein said indicia on third section front face includes human readable indicia indicating a first attempt to deliver a package, and wherein said indicia on said second section front face includes human readable indicia indicating a second attempt to deliver a package.

2. A business form as recited in claim 1 wherein said indicia imaged on said first, second, and third section front faces includes bar code indicia that is in common on each of said first, second, and third section front faces.

3. A business form as recited in claim 2 wherein said indicia imaged on said second and third section front faces includes a toll free phone number.

4. A business form as recited in claim 1 in a pad with a plurality of other business forms, identical except for some indicia thereon, said repositional adhesive on said first and third sections in contact with the front faces of first and third sections, respectively, of another business form in said pad.

5. A business form as recited in claim 1 wherein said sheet is quadrate and said top and bottom edges are substantially parallel to each other and substantially perpendicular to said side edges; and wherein said form consists of said first, second, and third sections.

6. A business form as recited in claim 1 wherein said sheet is quadrate and said top and bottom edges are substantially parallel to each other and substantially perpendicular to said side edges; and wherein said form consists of said first, second, and third sections.

7. A business form as recited in claim 1 wherein said adhesive on said first section rear face engages and is held to a package.

8. A business form as recited in claim 1 further comprising reason for non-delivery machine and human readable indicia imaged on said first section front face, comprising at least three different machine readable indicia elements, and associated human readable indicia elements, giving potential reasons for non-delivery of a package.

9. A package delivery facilitating business form comprising:

a sheet of imagable material having top and bottom edges, first and second side edges, a front face, and a rear face;

at least one line of weakness formed in said sheet extending generally parallel to at least one of said top and bottom edges, and defining said sheet into at least first and second sections, said first section containing or adjacent said top edge;

repositional pressure sensitive adhesive disposed on said second section rear face, and pressure sensitive adhesive disposed on said first section rear face;

indicia imaged on said first and second section front faces, including common machine readable indicia; and reason for non-delivery machine and human readable indicia imaged on said first section front face, comprising at least three different machine readable indicia elements, and associated human readable indicia elements, giving potential reasons for non-delivery of a package.

10. A business form as recited in claim 9 further comprising a release liner covering said repositional pressure sensitive adhesive on said second section rear face; and wherein said first section adhesive is in engagement with a package to be delivered.

11. A business form as recited in claim 10 further comprising a third section separated by a second line of weakness from said second section, and having a rear face with repositional adhesive, and a front face with indicia imaged thereon.

12. A business form as recited in claim 11 wherein said indicia imaged on said front face of each of said second and third sections comprises human readable indicia indicating an attempt to deliver a package.

13. A method of facilitating accurate delivery of a package utilizing a business form having a plurality of adhesive-backed sections including a first section having machine readable identification indicia, and reason for non-delivery machine and human readable indicia, comprising at least three different machine readable indicia elements, and associated human readable indicia elements, giving potential reasons for non-delivery of a package, imaged thereon, and also including another section; said method comprising the steps of:

(a) unsuccessfully attempting to deliver a package at a first location;

(b) scanning the machine readable identification indicia and the appropriate, selected, reason for non-delivery machine readable indicia on the business form first section, to read these indicia into a database;

(c) separating another section of the business form from the first section, and using the adhesive backing of another section, securing it to a surface at the first location;

(d) securing the business from first section, using the adhesive backing of the first section, to the package unsuccessfully delivered; and (e) transporting the unsuccessfully delivered package with first section of the business form applied thereto to a second location awaiting attempted re-delivery or return of the package.

14. A method as recited in claim 13 wherein the business form includes second and third sections, the second and third sections having repositional adhesive and the second section having a release liner covering the repositional adhesive; and wherein step (c) is practiced to separate and secure the third section.

15. A method as recited in claim 14 comprising the further steps of: (f) unsuccessfully attempting to deliver the package at the first location a second time; (g) separating the second section of the business form from the first section, removing the release liner from the adhesive backing of the second section, and using the adhesive backing of the second section, securing it to a surface at the first location; and (h) transporting the unsuccessfully delivered package with first section of the business form applied thereto to the second or to a third location awaiting attempted re-delivery or return of the package.

16. A method as recited in claim 15 wherein the business form is in a pad of like business forms, with different identification indicia; and comprising the further step of removing the business form from the pad of business forms prior to the practice of step (d).

17. A method as recited in claim 13 wherein another section of the business form includes one or more blank areas for potential other delivery dates or times; and comprising the further step of hand writing a potential other delivery date or time in the blank areas prior to step (e).

18. A business form comprising:

a sheet of imagable material having top and bottom edges, first and second side edges, a front face, and a rear face;

at least two lines of weakness formed in said sheet extending generally parallel to at least one of said top and bottom edges, and defining said sheet into at least first, second and third sections, said second section between said first and third sections, said first section containing or adjacent said top edge, and said third section containing or adjacent said bottom edge;

repositional pressure sensitive adhesive disposed on said third and second section rear faces, and pressure sensitive adhesive disposed on said first section rear face;

indicia imaged on said first, second, and third section front faces;

a release liner covering said repositional pressure sensitive adhesive on said second section rear face; and wherein said first and third rear faces are devoid of a release liner; and reason for non-delivery machine and human readable indicia imaged on said first section front face, comprising at least three different machine readable indicia elements, and associated human readable indicia elements, giving potential reasons for non-delivery of a package.

19. A business form as recited in claim 18 wherein said adhesive on said first section rear face engages and is held to a package, while said second section is attached to said first section with said release liner covering said repositional pressure sensitive adhesive on said second section rear face.

20. A business form as recited in claim 18 wherein said pressure sensitive adhesive disposed on said first section rear face is repositional adhesive.

* * * * *